US010641977B2

(12) United States Patent
Wang et al.

(10) Patent No.: US 10,641,977 B2
(45) Date of Patent: May 5, 2020

(54) OPTICAL SUBASSEMBLY WITH DETACHABLY-COUPLING HOLDER

(71) Applicant: Finisar Corporation, Sunnyvale, CA (US)

(72) Inventors: William H. Wang, Pleasanton, CA (US); Huaping Peng, Shanghai (CN); Ranran Zhang, Shanghai (CN); Yandong Mao, Shanghai (CN); Shamei Shi, Shanghai (CN)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 16/383,027

(22) Filed: Apr. 12, 2019

(65) Prior Publication Data

US 2019/0317283 A1    Oct. 17, 2019

Related U.S. Application Data

(60) Provisional application No. 62/657,146, filed on Apr. 13, 2018.

(51) Int. Cl.
*G02B 6/42* (2006.01)
(52) U.S. Cl.
CPC ......... *G02B 6/4233* (2013.01); *G02B 6/4261* (2013.01); *G02B 6/4292* (2013.01)
(58) Field of Classification Search
CPC .. G02B 6/4233; G02B 6/4292; G02B 6/4261; G02B 6/4231; G02B 6/4239
See application file for complete search history.

(56) References Cited

U.S. PATENT DOCUMENTS

| | | | | |
|---|---|---|---|---|
| 6,302,596 | B1 | 10/2001 | Cohen et al. | |
| 7,883,274 | B2* | 2/2011 | Luo | G02B 6/4284 385/134 |
| 9,794,017 | B2* | 10/2017 | O'Daniel | G02B 6/4219 |
| 9,918,416 | B2* | 3/2018 | Mao | H05K 9/0058 |
| 10,142,046 | B2* | 11/2018 | O'Daniel | H04B 10/503 |
| 10,359,586 | B2* | 7/2019 | Teo | G02B 6/428 |
| 2006/0215970 | A1* | 9/2006 | Mizue | G02B 6/3878 385/92 |
| 2009/0279831 | A1* | 11/2009 | Luo | H01R 13/6335 385/53 |
| 2014/0193121 | A1* | 7/2014 | Peternel | G02B 6/4257 385/89 |
| 2016/0192545 | A1* | 6/2016 | Mao | H05K 9/0058 398/136 |

(Continued)

OTHER PUBLICATIONS

International Search Report and Written Opinion dated Jul. 4, 2019, in related PCT Application No. PCT/US2019/027368.

*Primary Examiner* — Andrew Jordan
(74) *Attorney, Agent, or Firm* — Maschoff Brennan

(57) ABSTRACT

An example optoelectronic module may include an optical subassembly (OSA), an optical port block, a housing, and a holder. The OSA may be configured to convert between optical and electrical signals. The optical port block may be attached to the OSA and may be configured to optically align a fiber optic cable with the OSA. The housing may be configured to substantially enclose the OSA and the optical port block. The holder may be configured to couple the OSA and the optical port block to the housing. The holder may be detachably coupled to the optical port block and fixedly coupled to the housing.

20 Claims, 11 Drawing Sheets

(56) References Cited

U.S. PATENT DOCUMENTS

| | | |
|---|---|---|
| 2017/0048015 A1 | 2/2017 | O'Daniel |
| 2017/0097484 A1 | 4/2017 | Teo et al. |
| 2018/0183540 A1* | 6/2018 | O'Daniel ............. G02B 6/4219 |
| 2019/0317283 A1* | 10/2019 | Wang ................... G02B 6/4292 |

* cited by examiner (a)

(b)

(c)

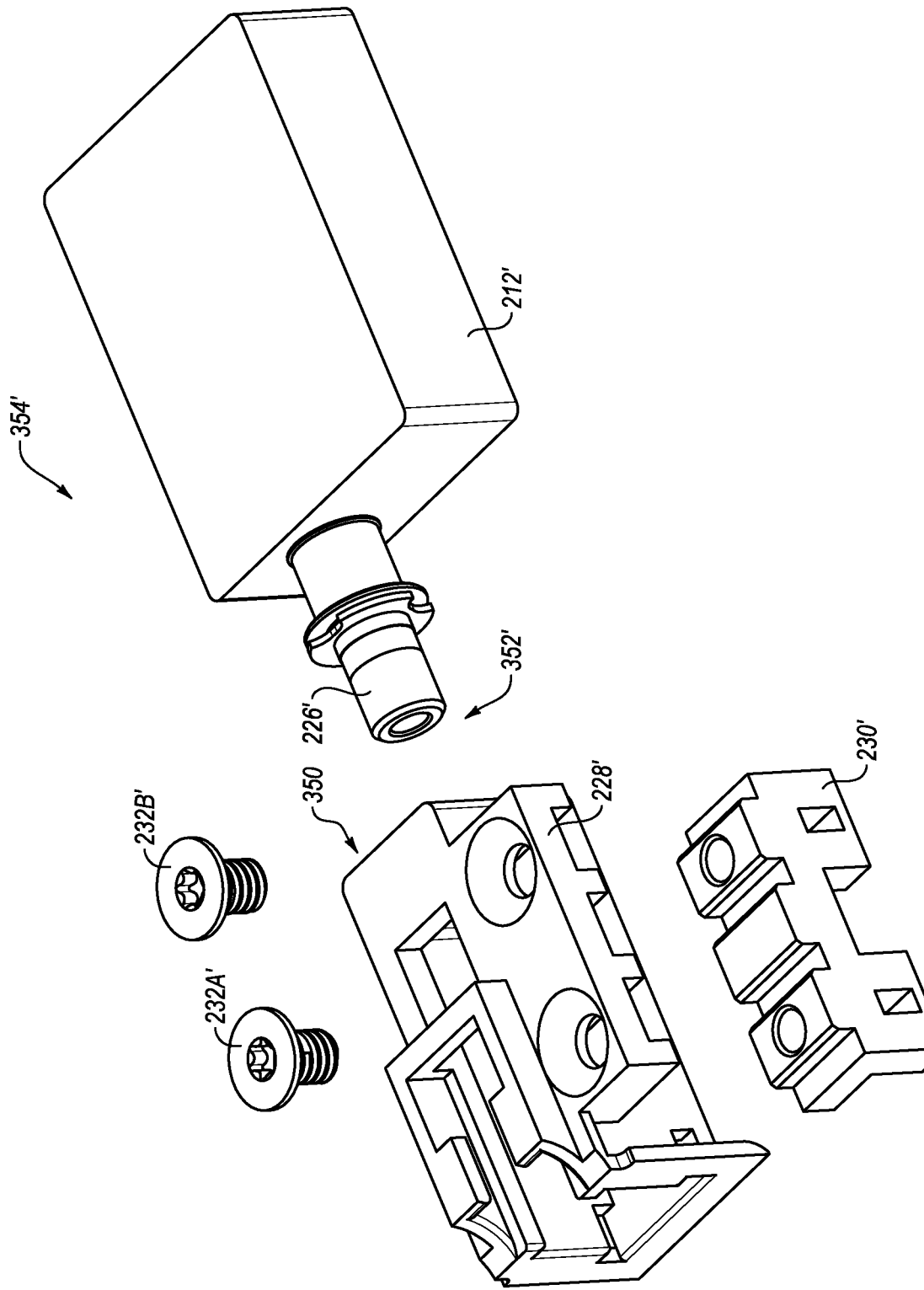

OPTICAL SUBASSEMBLY WITH DETACHABLY-COUPLING HOLDER

CROSS-REFERENCE TO RELATED APPLICATION

This application claims the benefit of and priority to U.S. Provisional App. No. 62/657,146, filed Apr. 13, 2018. The Ser. No. 62/657,146 application is incorporated herein by reference.

FIELD

The present disclosure generally relates to optoelectronic modules. Some embodiments relate to reducing stress-induced optical misalignment in optoelectronic modules.

BACKGROUND

Unless otherwise indicated herein, the materials described herein are not prior art to the claims in the present application and are not admitted to be prior art by inclusion in this section.

Communication modules, such as optoelectronic transceiver modules, may include various components that engage in the transmission and reception of optical signals. Some of the components may be housed within a shell of the optical transceiver module. Examples of such components may include a transmitter optical subassembly ("TOSA") and/or a receiver optical subassembly ("ROSA"). The optical transceiver module itself is operably received within a host device that serves as one component of a communications network.

To engage in optical communication with other communication modules, the optoelectronic transceiver module may operably connect with a connectorized optical fiber. Connection with the subassembly may induce optical misalignment between the optical fiber and an optical subassembly (OSA).

As the optical lane speed goes up from 10G to 25G and 50G, the well aligned optics, on the order of sub-micrometer precision, inside an OSA become more sensitive to external forces and bending moments caused by assembly procedures and thermal pads. Minute movements, including shifting or rotation of the optics, may cause large optical power loss due to optical misalignment. Traditional techniques for securing the OSA inside a module included fasteners, mechanical enclosure features, or adhesives. The stresses induced by the assembly processes and residual stresses may be significant and may result in large output optical power loss. Accordingly, techniques for reducing or eliminating mechanical stresses causing optical misalignment in an optoelectronic module including an OSA would be beneficial.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An example optoelectronic module may include an OSA, an optical port block, a housing, and a holder. The OSA may be configured to convert between optical and electrical signals. The optical port block may be attached to the OSA and may be configured to optically align a fiber optic cable with the OSA. The housing may be configured to substantially enclose the OSA and the optical port block. The holder may be configured to couple the OSA and the optical port block to the housing. The holder may be detachably coupled to the optical port block and fixedly coupled to the housing.

In some embodiments, the holder may be fixedly coupled to the housing after assembly of the optoelectronic module and may be floatably coupled to the housing during assembly of the optoelectronic module. The holder may be fixedly coupled to the housing after assembly by cured epoxy and may be floatably coupled to the housing during assembly by uncured epoxy. The OSA may be removable from the optoelectronic module without destruction of the OSA. The optical port block may be fixedly coupled to the OSA and may be removable from the optoelectronic module with the OSA without destruction of the optical port block.

Another example optoelectronic module may include an assembly, a housing, and at least one holder. The assembly may include an OSA and an optical port block fixedly attached to the OSA. The OSA may be configured to convert between optical and electrical signals and the optical port block may be configured to optically align a fiber optic cable with the OSA. The housing may be configured to substantially enclose the assembly. The at least one holder may be configured to couple the assembly to the housing. The at least one holder may detachably couple on a first end to the assembly and may floatably couple on a second end to the housing while the housing is assembled to exert balanced forces on the OSA. The at least one holder may fixedly c, couple on the second end to the housing after the housing is assembled around the assembly.

In some embodiments, the assembly may be mechanically and electrically compliant with one of a SFP+ standard, an XFP standard, or a QSFP standard. The at least one holder may detachably couple on the first end to the assembly using one or more screws. The at least one holder may floatably couple on the second end to the housing using uncured epoxy while the housing is assembled. The at least one holder may fixedly couple on the second end to the housing by curing the uncured epoxy. The optoelectronic module may further include at least one thermal pad placed between the OSA and the housing. The OSA may be removable from the optoelectronic module without destruction of the OSA or the assembly may be removable from the optoelectronic module without destruction of the assembly.

An example method may include coupling an OSA to an optical port block to form an assembly, the optical port block optically aligned with the OSA. The method may include detachably coupling at least one holder to the optical port block. The method may include floatably coupling the at least one holder to at least a portion of a housing of an optoelectronic module, the housing configured to substantially enclose the assembly. The method may include enclosing the assembly with the housing. The method may include fixedly coupling the at least one holder to the at least a portion of the housing after the housing is assembled around the assembly.

In some embodiments, coupling the OSA to the optical port block includes fixedly coupling the OSA to the optical port block, enclosing the assembly with the housing includes exerting forces on the assembly, and the assembly moves as a single unit responsive to the exerted forces such that the OSA and the optical port block remain optically aligned. Detachably coupling the at least one holder to the optical port block may include coupling the at least one holder to the optical port block using one or more screws. Floatably coupling the at least one holder may include coupling the at least one holder to the housing using uncured epoxy. Fixedly coupling the at least one holder include curing the uncured epoxy after enclosing the assembly. The method may further include placing at least one thermal pad between the OSA and the housing. The method may further include salvaging the OSA or the assembly from the optoelectronic module. Salvaging the OSA or the assembly may include removing the OSA or the assembly from the optoelectronic module without destroying the OSA or the assembly.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings.

FIGS. 7A and 7B illustrate views of another example OSA-port block-holder assembly of an optoelectronic module;

DETAILED DESCRIPTION OF SOME EXAMPLE EMBODIMENTS

Figure 1:
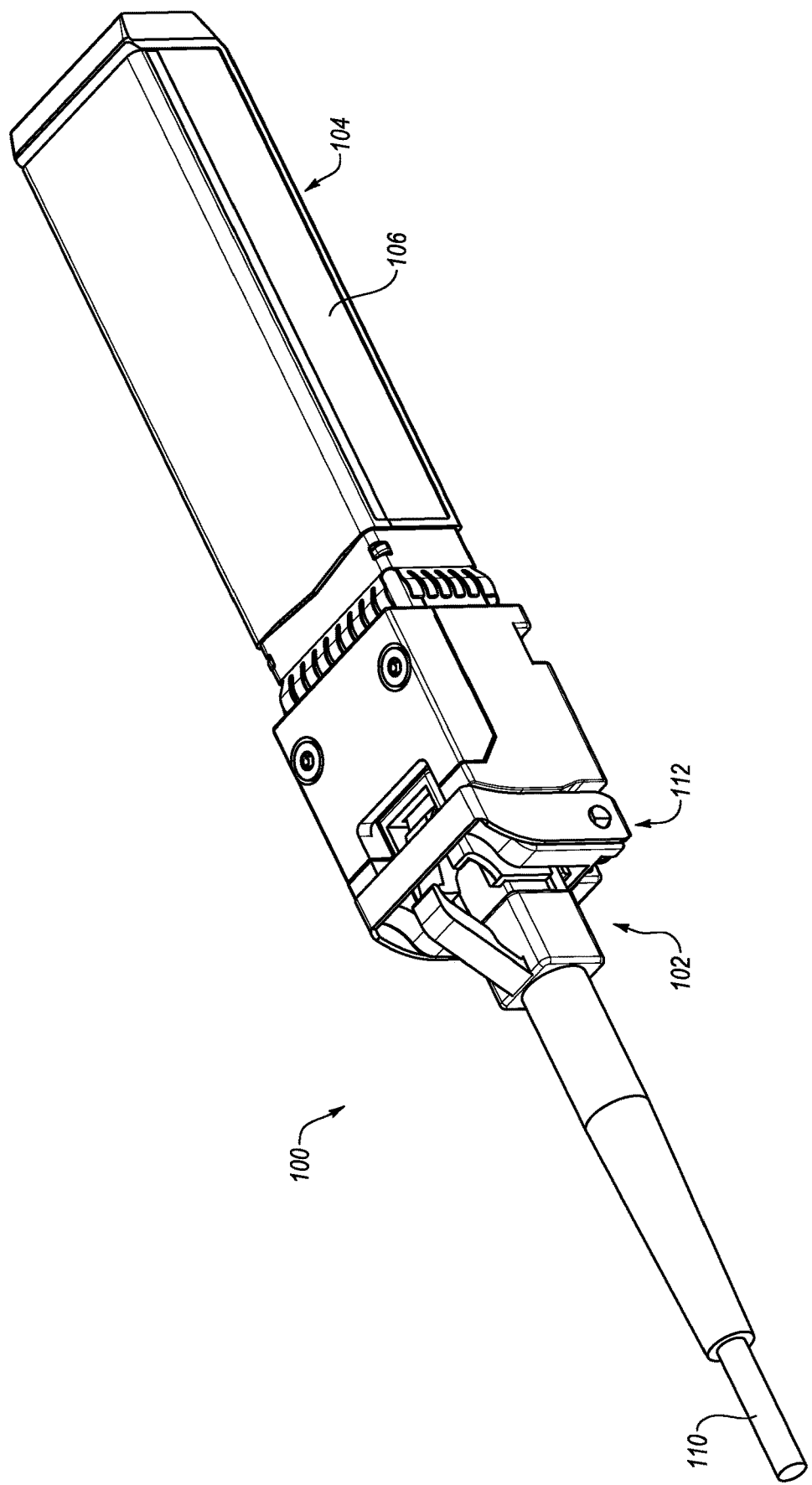
FIG. 1 is a perspective view of an example optoelectronic module.

Particular embodiments of the present disclosure will be described with reference to the accompanying drawings. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of configurations, all of which are explicitly contemplated herein.

The present disclosure generally relates to reducing stress-induced misalignment in optoelectronic modules. In particular, some embodiments relate to reducing deflection of the OSA with respect to a coupled optical fiber. More particular, some embodiments relate to structures and methods for securing an OSA inside of an optoelectronic module housing with low to no stress between a connector (e.g., an optical port block) that receives the optical fiber coupler and the OSA.

As the optical lane speed goes up from 10G to 25G and 50G, for example, aligned optics requiring sub-micrometer precision inside an OSA become more sensitive to external forces and bending moments caused by assembly procedures and thermal pads. Any small movement, including shifting or rotation of the optics, may cause large optical power losses due to misalignment.

Traditional techniques for securing the OSA inside a module have included fasteners such as screws, epoxies, or features on an enclosure, including thermal pads, used to retain the OSA. The stresses associated with such retention techniques may induce sufficient stresses to cause misalignment with the optical fiber. Such misalignment at high data rates may result in significant optical power loss. Further, such physical retention processes may also result in increased scrap as reworking optoelectronic modules and salvaging expensive components becomes difficult.

In some aspects, the embodiments described herein may reduce or eliminate misalignment stresses related to assembly processes associated with assembling an OSA in an optoelectronic module and/or in a housing of the optoelectronic module. In some embodiments, an OSA couples to an optical port block that includes a connector to receive an optical fiber connector. The optical port block may then be attachably and detachably mechanically coupled to a sacrificial spacer (e.g., holder). The sacrificial spacer may be fluidly coupled, e.g., through uncured epoxy, to one side of the optoelectronic module housing. Thereafter, the optoelectronic module housing may be further assembled to enclose the OSA and associated optical port block coupled thereto. After the OSA is enclosed by the optoelectronic module housing and subjected to the associated assembly stresses, the sacrificial spacer may be solidly coupled to the one side of the optoelectronic module housing, e.g., by curing the epoxy.

In further aspects, the embodiments described herein may facilitate reworking of the optoelectronic module and salvaging of the OSA from the optoelectronic module. In some embodiments, the optoelectronic module housing may be disassembled to expose the OSA and the coupled optical port block. The optical port block may be mechanically detached from the sacrificial spacer to allow salvaging of the OSA and the coupled optical port block.

Although the embodiments are described in the context of optoelectronic modules used in the field of optical networking, it will be appreciated that embodiments of the invention may be employed in other fields and/or operating environments where the functionality disclosed herein may be useful. Accordingly, the scope of the invention should not be construed to be limited to the example implementations and operating environments disclosed herein.

FIG. 1 is a perspective view of an example optoelectronic module 100, arranged in accordance with at least one embodiment described herein. The optoelectronic module 100 may include a housing 106 that extends between a first end portion 102 and a second end portion 104 of the optoelectronic module 100. The first end portion 102 of the optoelectronic module 100 is configured to interface with a fiber optic cable 110 that includes one or more optical fibers. In the illustrated configuration, the fiber optic cable 110 is coupled to the first end portion 102.

The optoelectronic module 100 may be permanently attached to the fiber optic cable 110, and thus the optoelectronic module 100 may represent one end of an "active cable" which may include another optoelectronic module permanently attached to the other end of the fiber optic cable 110. Alternatively, the fiber optic cable 110 could instead be releasably connected to the optoelectronic module 100, in which case the optoelectronic module 100 would function as a stand-alone module. In some embodiments, the fiber optic cable 110 is a multichannel fiber-optic communication cable that includes twenty-four (24) fibers, twelve (12) of which are employed to transfer data signals in one direction, and twelve (12) of which are employed to transfer data signals in the opposite direction.

The optoelectronic module 100 can be configured for optical signal transmission and reception at a variety of per-second data rates, such as 150 gigabits per second (Gb/s or G) or higher. In addition, although the example optoelectronic module 100 is configured to be substantially compliant with the SFP+ specifications, the optoelectronic module 100 can instead be configured to assume a variety of different form factors that are substantially compliant with various transceiver and/or transponder multisource agreements (MSAs), such as C form-factor pluggable (CFP), small form factor (SFF), small form-factor pluggable (SFP), 10 Gigabit small form factor pluggable (XFP), XPAK, X2, XENPAK, or quad small form-factor pluggable (QSFP).

The optoelectronic module 100 may be designed to be plugged into a larger electronic system such as a printed circuit board ("PCB") of a host device or the like. For example, the optoelectronic module 100 includes a latching mechanism 112 with a bail 114 or handle that may be operated to fasten and/or release the optoelectronic module 100 with respect to other components. In some configurations, the latching mechanism 112 may include a bail slider operably connected to a cam and configured to cause the cam to rotate about an axis of rotation to displace an end of a latch to disengage the latch from a host receptacle. Once mounted to a host PCB, the optoelectronic module 100 may be configured to communicate data between the host device and a network, for example.

The optoelectronic module 100 may convert electrical signals to optical signals that represent the electrical signals and vice versa. For example, data in the form of optical signals may be communicated from a network along the fiber optic cable 110 to the optoelectronic module 100. Components of the optoelectronic module 100 may convert the optical signals to electrical signals representative of the optical signals. The electrical signals may then be communicated to the host device. Likewise, the host device may communicate electrical signals to the optoelectronic module 100. The optoelectronic module 100 may convert the electrical signals to optical signals representative of the electrical signals. The optical signals may be communicated along the fiber optic cable 110 into the network to, e.g., another optoelectronic module 100.

Figure 2:
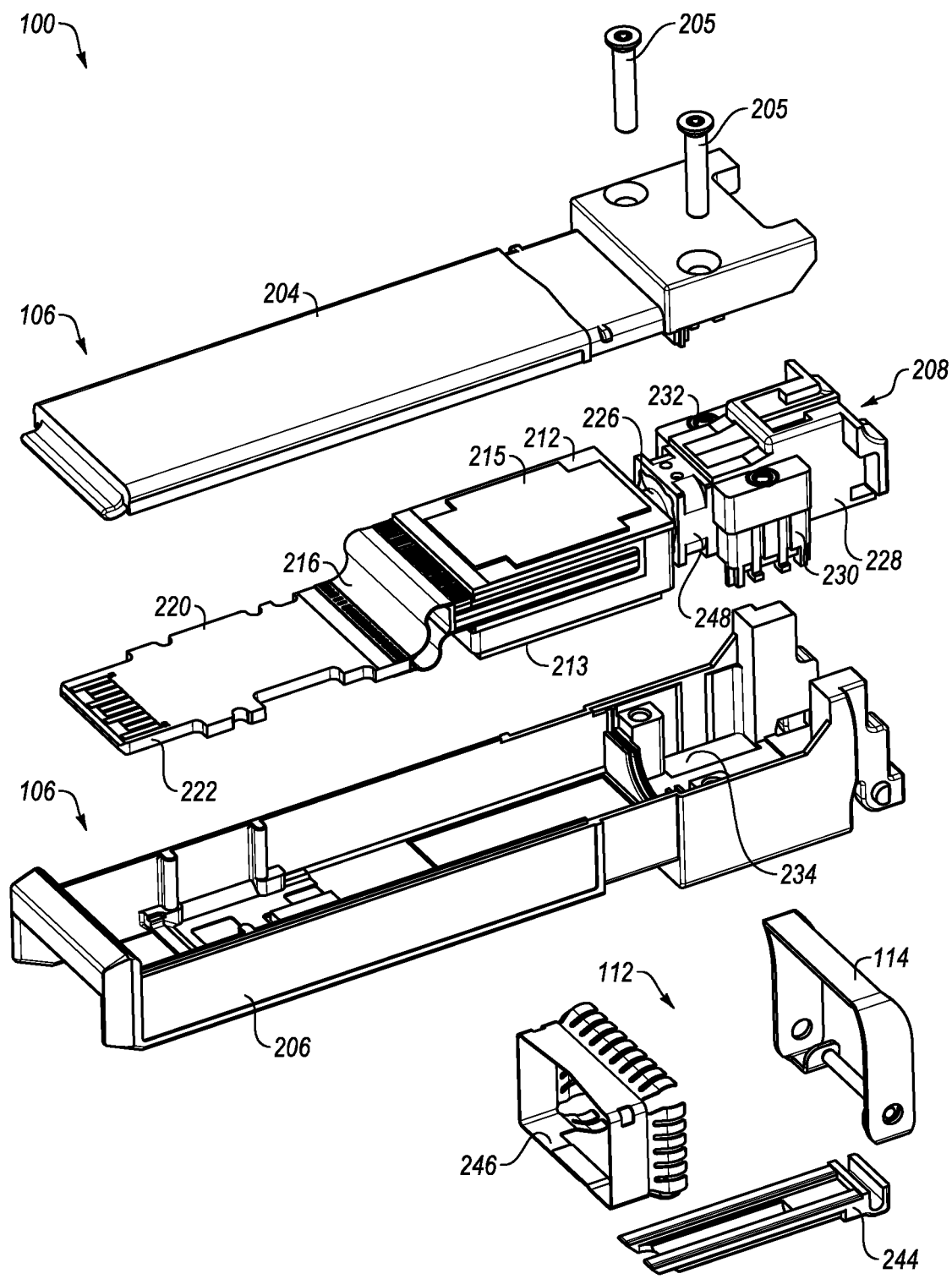
FIG. 2 is an exploded view of the optoelectronic module of FIG. 1.

FIG. 2 is an exploded view of the optoelectronic module of FIG. 1, arranged in accordance with at least one embodiment described herein. The optoelectronic module 100 includes various components, including the housing 106 that includes a top shell 204 attached via, for example, screws 205 to a bottom shell 206, and a port 208. The top shell 204 and the bottom shell 206 can be formed using a die casting process, machining operation, or any other suitable process(es). One example material from which the top shell 204 and the bottom shell 206 may be die cast is zinc, although the top shell 204 and the bottom shell 206 may alternatively be die cast or otherwise constructed from other suitable materials such as aluminum, or any other suitable material(s).

The optoelectronic module 100 also includes one or more of a TOSA or a ROSA, generally OSA 212, electrical interfaces coupled through, for example, a flex circuit 216, and a printed circuit board assembly (PCBA) 220 having an area of gold finger pads 222 for inserting to an edge connector.

The OSA 212 of the optoelectronic module 100 may include a receptacle 226 that extends from the body of the OSA 212 and is received in and/or retained by a sleeve 248 on an end of an optical port block 228 that forms the port 208. The port 208 is configured to optically connect the OSA 212 with an optical fiber (not shown) removably received within the port 208. The optical port block 228 may be oriented toward and/or positioned at or near the first end portion 102 of FIG. 1.

The optical port block 228 may further removably attach to one or more holders 230 using one or more screws 232. The one or more holders 230 may be fixedly attached to the bottom shell 206 using an adhesive, such as epoxy 234. Each holder 230 may alternatively or additionally be referred to as a spacer or a sacrificial spacer.

The optoelectronic module 100 may be configured to support various communication standards, such as Fast Ethernet, Gigabit Ethernet, 10 Gigabit Ethernet, and 1×, 2×, 4×, and 10× Fibre Channel. In addition, although one example of the optoelectronic module 100 is configured to have a form factor that is substantially compliant with the SFP+(IPF) MSA, the optoelectronic module 100 can alternatively be configured to have a variety of different form factors that are substantially compliant with other MSAs, such the SFP MSA or the QSFP MSA, or any newer and future MSAs such as SFP-DD, DSFP, microQSFP, QSFP-DD and OSFP, or any proprietary specifications.

The optoelectronic module 100 may further include one or more thermal pads 213 and H thermal paste 215. The optoelectronic module 100 may also include the latching mechanism 112 which includes the bail 114 and a bail slider 244. The optoelectronic module 100 further includes an EMI collar 246 to reduce EMI leakage around the port 208.

The embodiment illustrated in FIG. 2 is specific to a bidirectional (BiDi) SFP+ module. However, the OSA 212 and the optical port block 228 may be configured according to other standards, including a BiDi QSFP+ module as detailed with respect to FIGS. 7-10. Other optical standards are also contemplated and may find benefits from the techniques described herein.

Figure 3:
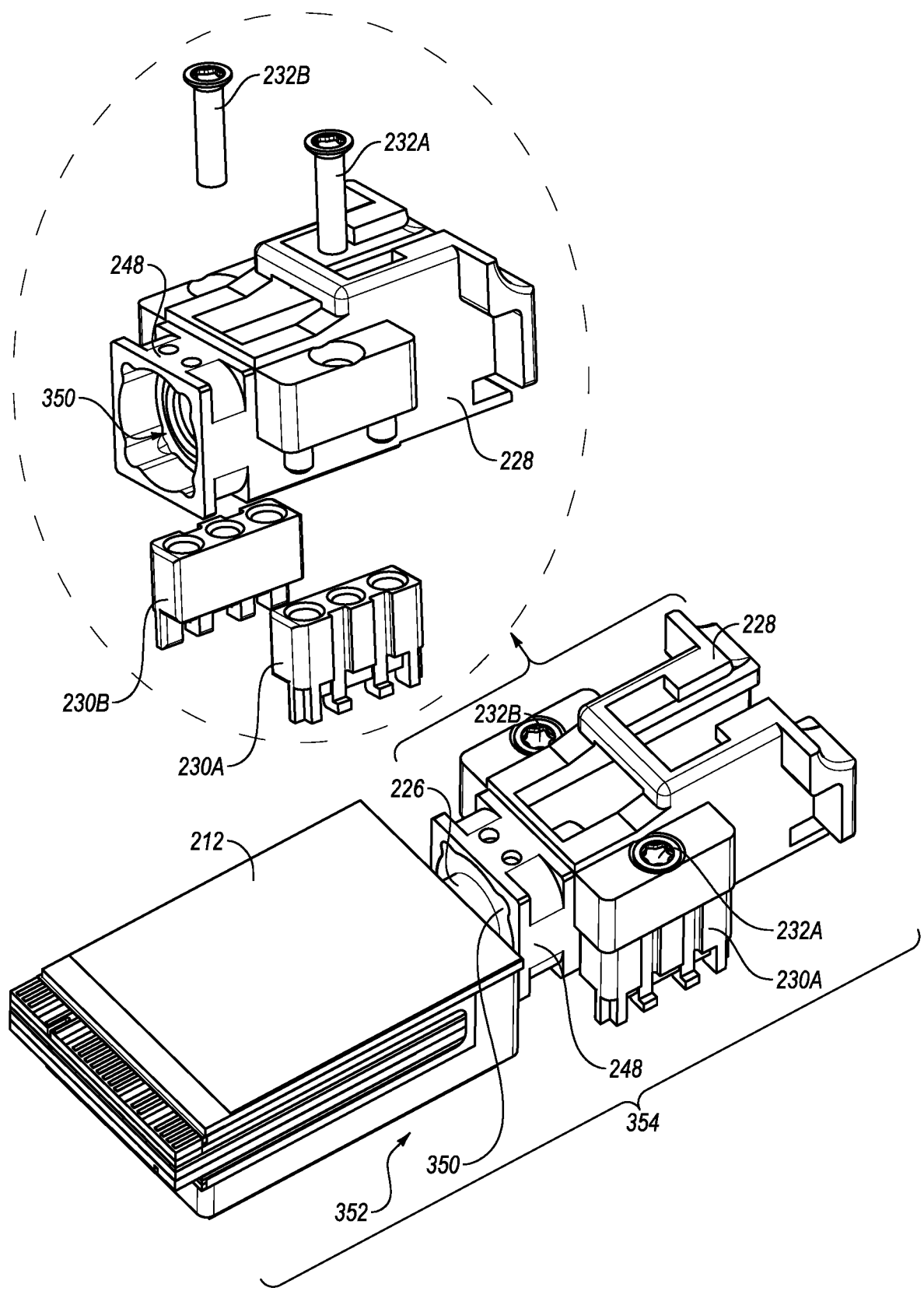
FIG. 3 is a perspective view of a portion of the optoelectronic module of FIGS. 1

FIG. 3 is a perspective view of a portion of the optoelectronic module 100 of FIGS. 1 and 2, arranged in accordance with at least one embodiment described herein. In particular, FIG. 3 includes a perspective view of the OSA 212, the optical port block 228, and the holders 230 (specifically labeled 230A and 230B in FIG. 3) assembled together. FIG. 3 additionally includes, within the dashed outline, an exploded view of the optical port block 228, the holders 230A and 230B, and screws 232A and 232B (both instances of screws 232 of FIG. 2). The illustrated embodiment is for a BiDi SFP+ standard, but may find application to other standards as well. The OSA 212 including the receptacle 226 may be fixed to the sleeve 248 of the optical port block 228 using, for example, an adhesive such as an epoxy 350. When fixedly attached, the OSA 212 and optical port block 228 together form an OSA-port block assembly 352. The optical port block 228 may have one or more holders 230A and 230B removably attached using one or more screws 232A and 232B. When removably attached, the one or more holders 230A and 230B and the OSA-port block assembly 352 together form an OSA-port block-holder assembly 354.

During assembly of the optoelectronic module 100, the OSA-port block-holder assembly 354 may be formed external to the other portions of the optoelectronic module 100 with the OSA 212 and the optical port block 228 being properly aligned to each other without any induced stresses from the housing 106 or the thermal pads 213.

Figure 4:
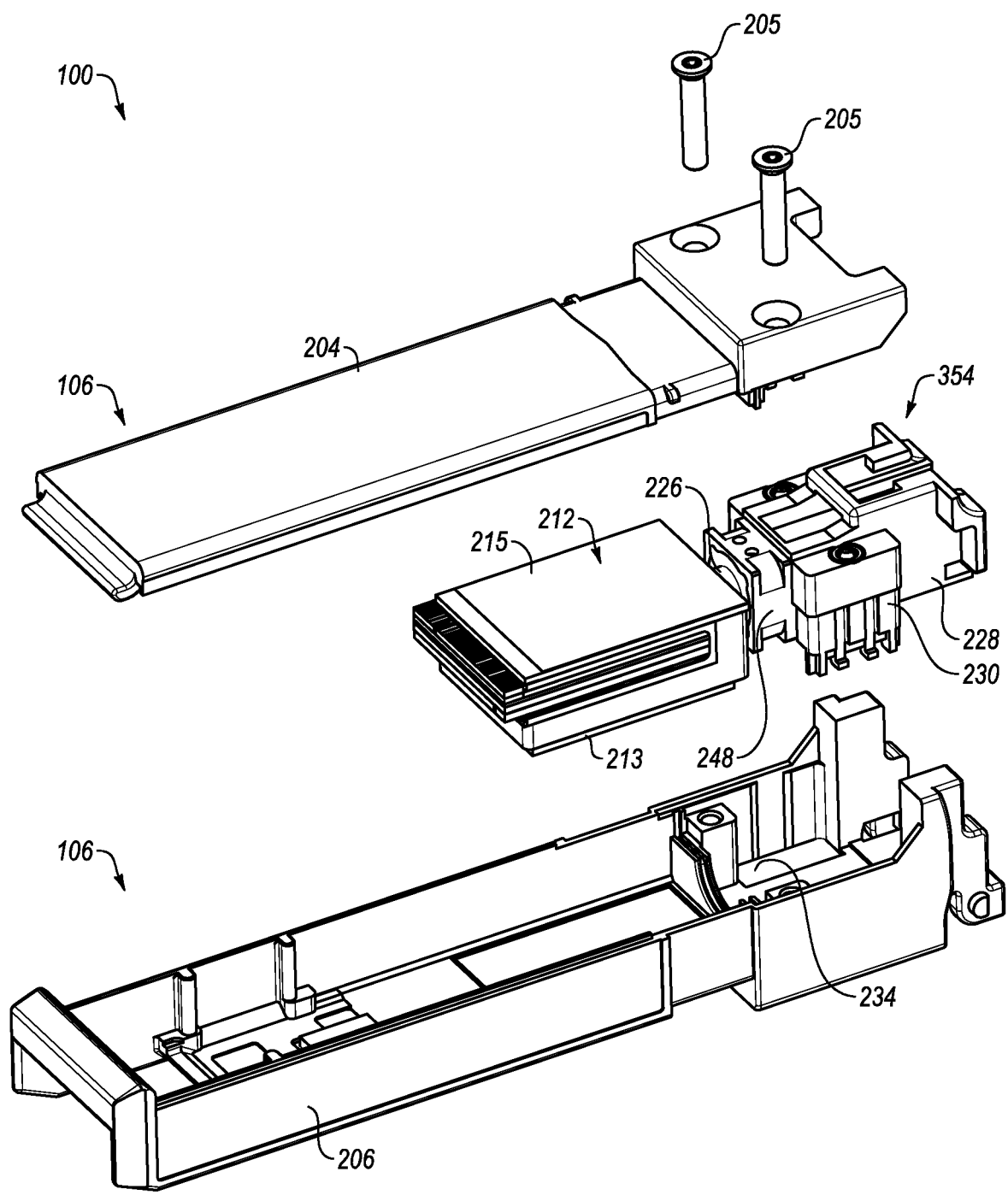
FIG. 4 is a partially exploded view of the optoelectronic module of FIGS. 1 and 2 used to describe an example assembly process.

FIG. 4 is a partially exploded view of the optoelectronic module 100 of FIGS. 1 and 2 used to describe an example assembly process, arranged in accordance with at least one embodiment described herein. The optoelectronic module 100 may be assembled by forming the OSA-port block-holder assembly 354, e.g., as described with respect to FIG. 3. The OSA-port block-holder assembly 354 may be formed by aligning the OSA 212 with the optical port block 228 and retaining the alignment using the epoxy 350 (FIG. 3) to retain the receptacle 226 of the OSA 212 in the sleeve 248 of the optical port block 228.

The OSA-port block-holder assembly 354 may be further formed by detachably or removeably attaching one or more holders 230 to the optical port block 228 using a form of non-destructive removable attachment such as one or more screws 232. Other components of the optoelectronic module 100 may be assembled in the housing or to the OSA-port block-holder assembly 354. For example, the thermal pad 213 may be attached to the OSA-port block-holder assembly 354 at any time prior to attachment of the OSA-port block-holder assembly 354 to the housing 106. Further, the flex 216 (FIG. 2) and the PCBA 220 (FIG. 2) may be attached to the OSA 212 at any suitable stage of assembly depending on a preferred sequence.

The assembly of the optoelectronic module 100 may continue by applying a retention mechanism, such as the epoxy 234, to one of the top shell 204 or the bottom shell 206. The epoxy 234 may be applied in a location on the housing 106 that aligns with a mating surface of the one or more holders 230. The epoxy may be applied but not cured until a later stage of the assembly. The assembled OSA-port block-holder assembly 354 is next placed in the housing 106, illustrated in FIGS. 2-4 as being placed in the bottom shell 206 with the holders 230 being aligned to and placed in contact with the epoxy 234.

Further assembly steps may be performed prior to attaching the top shell 204 to the bottom shell 206. For example, the flex 216 and the PCBA 220 may be coupled to the OSA 212 if these steps were not previously performed. Further, the thermal paste 215 may be applied to the OSA 212 if this step was not previously performed.

Continuing the assembly, the top shell 204 may then be aligned and attached to the bottom shell 206 using attachment means, an example of which may be screws 205. During attachment of the top shell 204 to the bottom shell 206, forces from the top shell 204 and the bottom shell 206 may be exerted on the OSA 212. However, since the OSA 212 is fixed to the optical port block 228, the OSA-port block-holder assembly 354 moves as a single assembly in response to these forces. Specifically, the holders 230 removeably attached to the optical port block 228 are "floating" with respect to the housing 106 since the OSA-port block-holder assembly 354 is attached to the housing 106 by uncured epoxy that allows the optical alignment between the OSA 212 and the optical port block 228 to remain unaffected since the OSA-port block-holder assembly 354 moves as a single unit in response to the forces associated with the housing 106 including the forces from the thermal pad 213 and the thermal paste 215. After the forces on the OSA-port block-holder assembly 354 have stabilized and equalized along the OSA-port block-holder assembly 354, the epoxy 234 may be cured.

Figure 5:
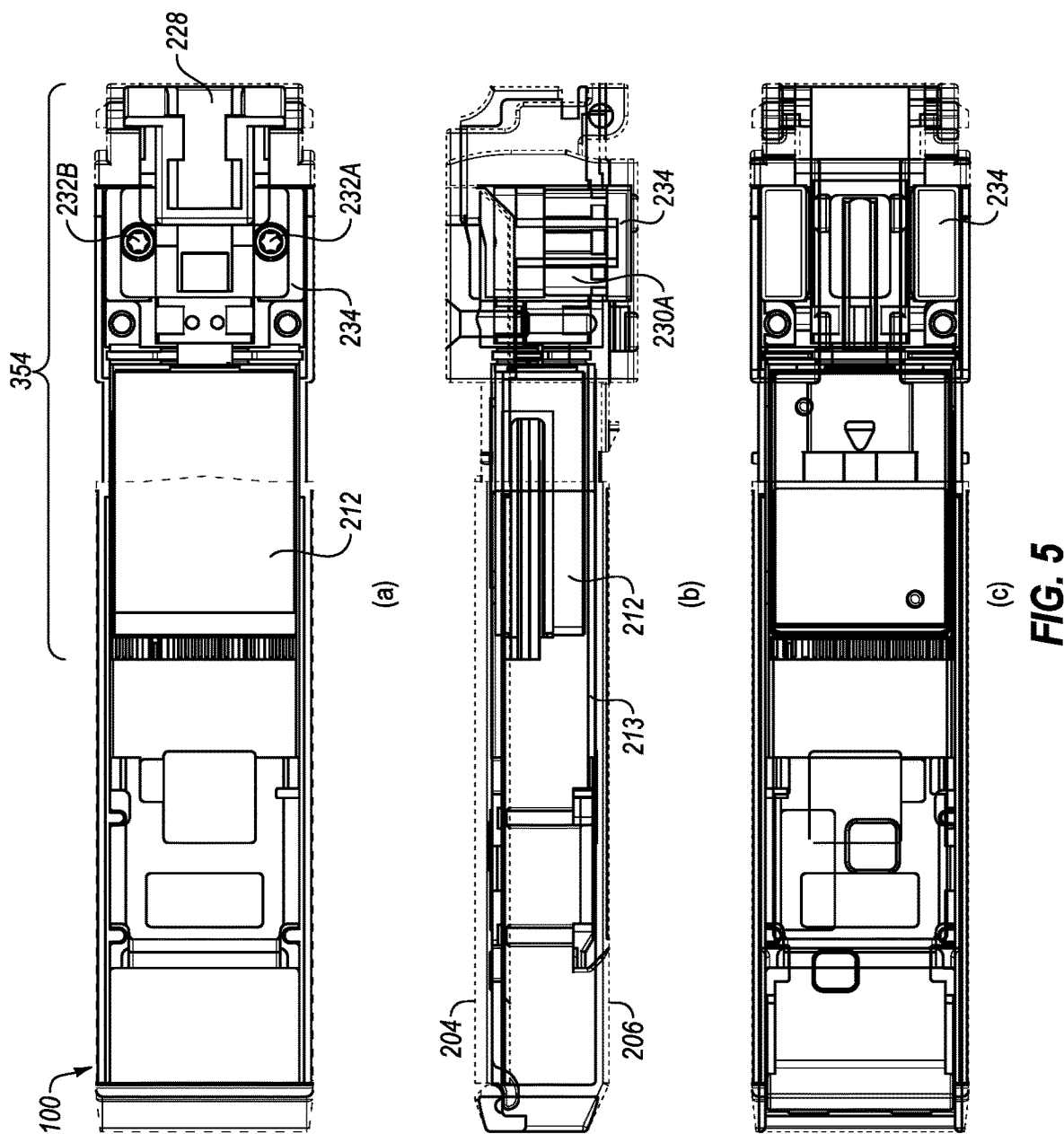
FIG. 5 illustrates various views of the assembled optoelectronic module of FIGS. 1 and 2.

FIG. 5 illustrates various views of the assembled optoelectronic module of FIGS. 1 and 2, arranged in accordance with at least one embodiment described herein. The views include a top view (a), a side view (b), and a bottom view (c). In the views of FIG. 5, the top shell 204 and the bottom shell 206 are transparent and shown by outlines, to show the arrangement of the various components in an assembled state.

The top view (a), side view (b), and bottom view (c) illustrate the optoelectronic module 100 with the OSA-port block-holder assembly 354 housed therein. The screws 232A and 232B couple the optical port block 228 to the respective holders 230A and 230B (side view (b)). The epoxy 234 in a cured state, couples the holders 230 to the bottom shell 206.

Figure 6:
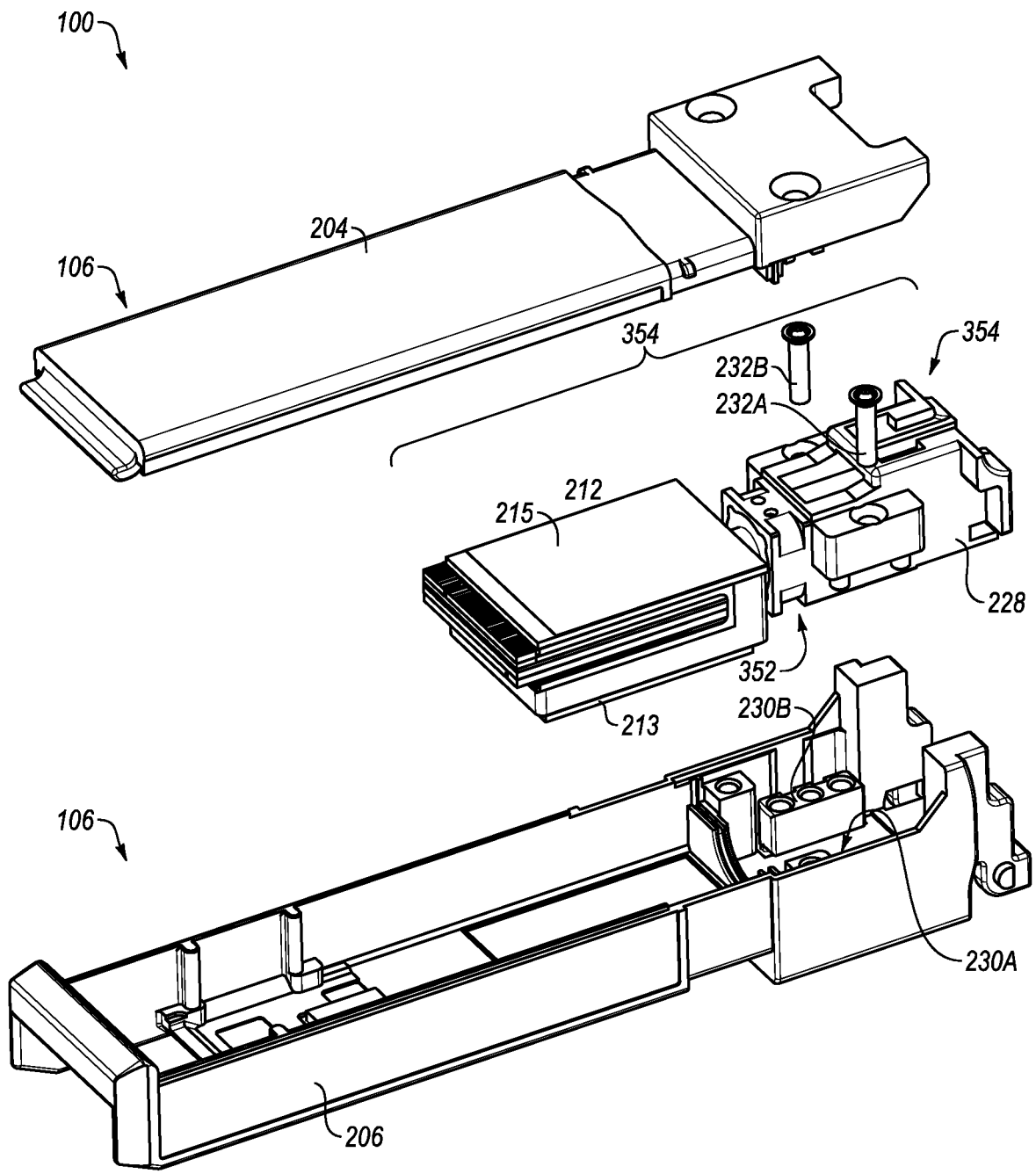
FIG. 6 is a partially exploded view of the optoelectronic module of FIGS. 1 and 2 used to describe an example reworking process.

FIG. 6 is a partially exploded view of the optoelectronic module 100 of FIGS. 1 and 2 used to describe an example reworking process, arranged in accordance with at least one embodiment described herein. While the assembly process identified above may reduce mechanical stresses on one or more of the OSA 212 and the optical port block 228 by assembling them as a "floating" OSA-port block assembly 352, the optoelectronic module 100 may exhibit malfunctions and/or it may be desirable to remove and salvage costly components from the optoelectronic module 100. Specifically, the OSA 212 is typically one of the most desirably salvaged components of the optoelectronic module 100, either for rework or for redeployment to another module.

Accordingly, the holders 230 function as sacrificial components or spacers that may be "left behind" with the housing 106 to salvage or retrieve the OSA 212 and the optical port block 228 from the optoelectronic module 100. For example, to rework or salvage desirable components from the optoelectronic module 100, the top shell 204 may be removed to provide access to the OSA-port block-holder assembly 354. The screws 232 may be removed to allow the OSA-port block assembly 352 to be removed from the holders 230 that are fixed (via epoxy 234) to the bottom shell 206. Thereafter, the OSA-port block assembly 352 may be reworked or salvaged for s reuse.

Figure 7A:
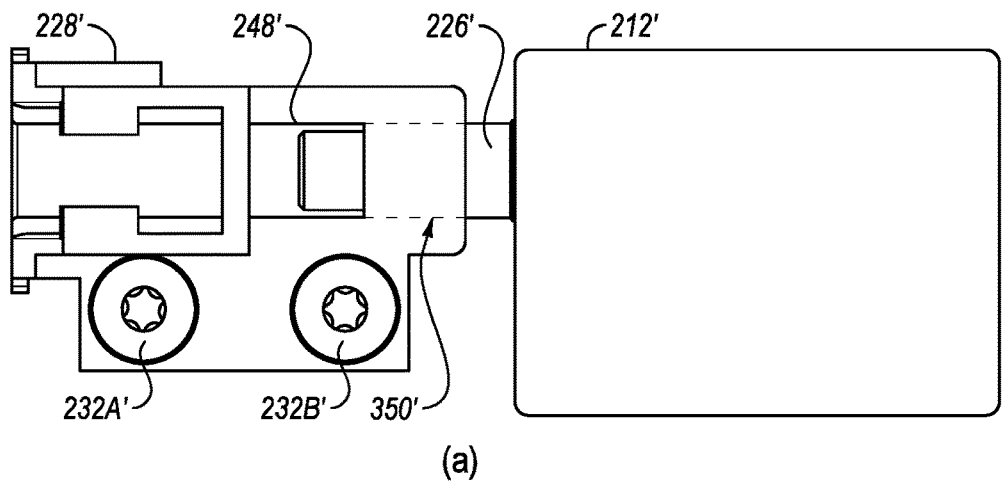
Figure 7A:
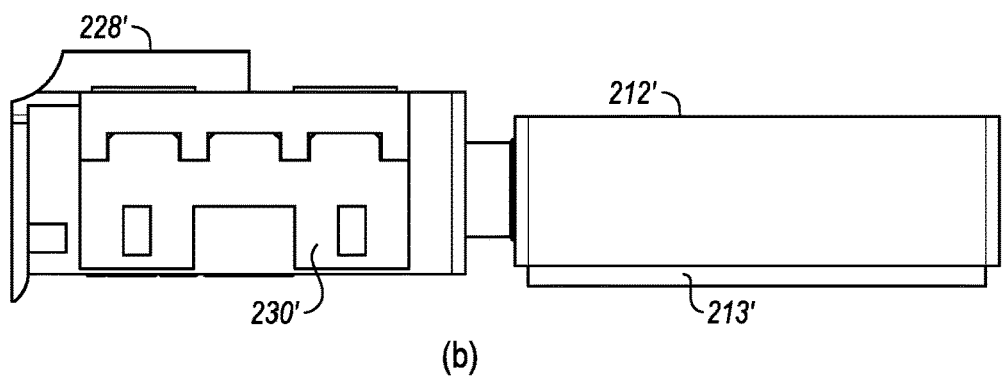
Figure 7A:
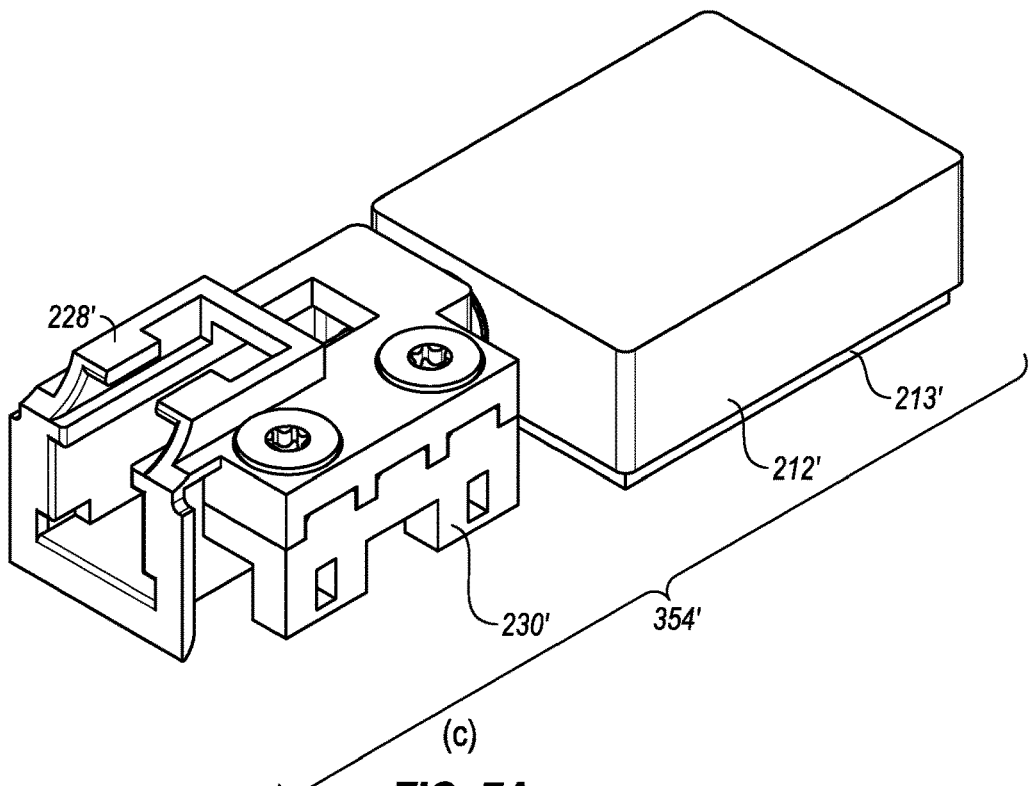

FIGS. 7A and 7B illustrate views of another example OSA-port block-holder assembly 354' of an optoelectronic module, arranged in accordance with at least one embodiment described herein. The illustrated embodiment is for a bidirectional (BiDi) QSFP+ standard, but may find application to other standards as well. The OSA-port block-holder assembly 354' may include an OSA 212' with a receptacle 226', an optical port block 228' with a sleeve 248', a holder 230', and screws 232A' and 232B' that may generally correspond, respectively, to the analogously named and numbered components already described with respect to FIGS. 1-6 other than having been adapted for a different standard. Other components of FIGS. 7A-10 that are analogously named and numbered relative to components of FIGS. 1-6 may similarly generally correspond to the corresponding components of FIGS. 1-6 other than having been adapted for a different standard.

FIG. 7A includes three views of the OSA-port block-holder assembly 354', including a top view (a), a side view (b), and a perspective view (c). FIG. 7B is an exploded perspective view of the OSA-port block-holder assembly 354'.

The OSA 212' including the receptacle 226' may be fixed using, for example, an adhesive such as an epoxy 350' to the sleeve 248' of the optical port block 228'. When fixedly attached, the OSA 212' and optical port block 228' together form an OSA-port block assembly 352'. The optical port block 228' may have one or more holders 230' removeably attached using one or more screws 232A' and 232B'. When removeably attached, the one or more holders 230' and the OSA-port block assembly 352' together form the OSA-port block-holder assembly 354'.

During assembly of the optoelectronic module 100' (FIGS. 8-10), the OSA-port block-holder assembly 354' may be formed external to the other portions of the optoelectronic module 100' with the OSA 212' and the optical port block 228' being properly aligned without any induced stresses from the housing 106' or the thermal pads 213'.

Figure 8:
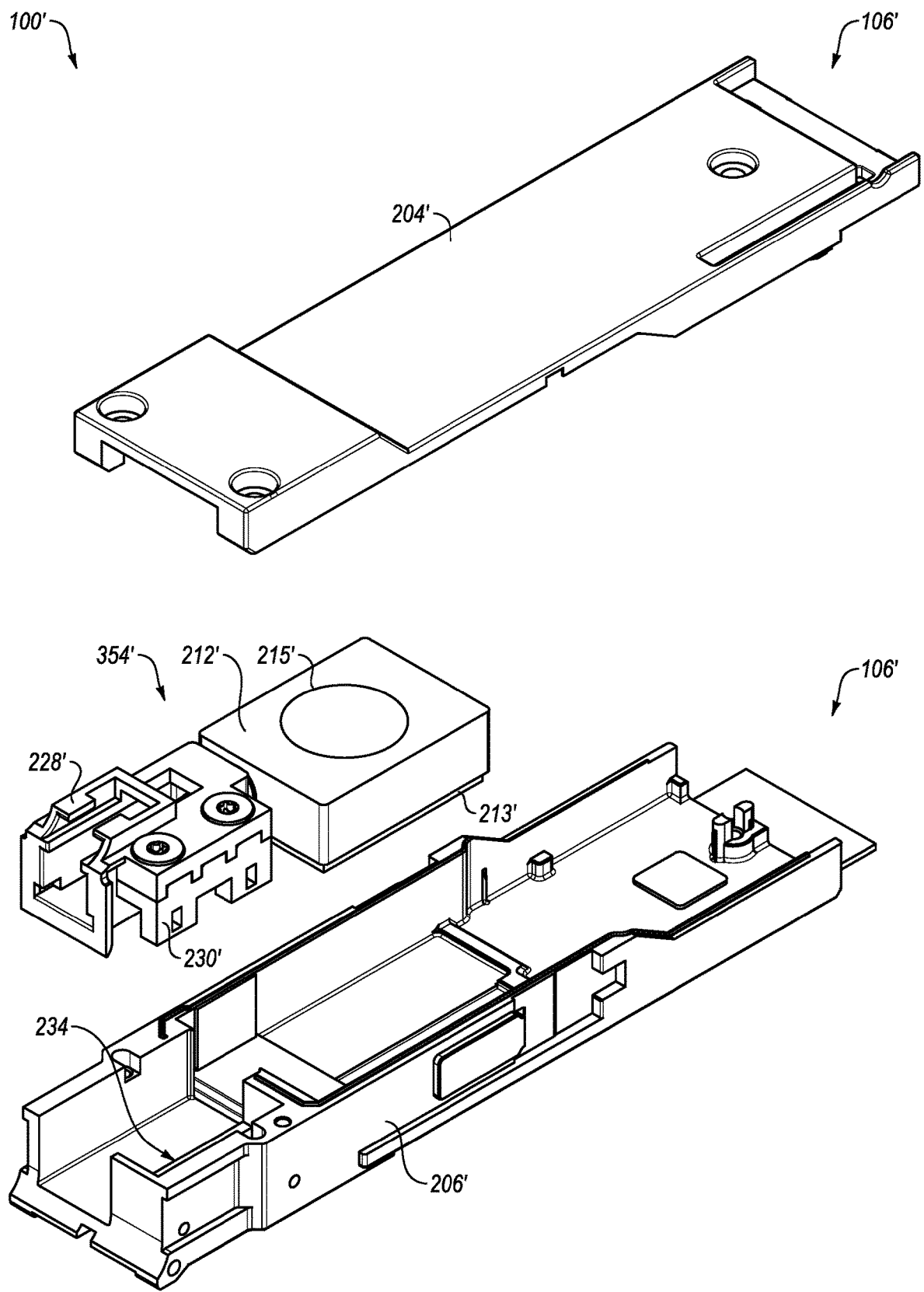
FIG. 8 is a partially exploded view of an optoelectronic module that includes the OSA-port block-holder assembly of FIGS. 7A and 7B used to describe an example assembly process.

FIG. 8 is a partially exploded view of an optoelectronic module 100' that includes the OSA-port block-holder assembly 354' of FIGS. 7A and 7B used to describe an example assembly arranged in accordance with at least one embodiment described herein. The optoelectronic module 100' may be assembled by forming the OSA-port block-holder assembly 354'. The OSA-port block-holder assembly 354' may be formed by aligning the OSA 212' with the optical port block 228' and retaining the alignment using the epoxy 350' (FIGS. 7A and 7B) to retain the receptacle 226' (FIGS. 7A and 7B) of the OSA 212' in the sleeve 248' (FIG. 7A) of the optical port block 228'.

The OSA-port block-holder assembly 354' may be further formed by detachably or removeably attaching one or more holders 230' to the optical port block 228' using a form of non-destructive removeable attachment such as one or more screws 232', such as screws 232A' and/or 232B' in FIGS. 7A and 7B. Other components of the optoelectronic module 100' may be assembled in the housing 106' or to the OSA-port block-holder assembly 354'. For example, the thermal pad 213' may be attached to the OSA-port block-holder assembly 354' at any time prior to attachment of the OSA-port block-holder assembly 354' to the housing 106'. Further, the flex and PCBA (not shown for clarity but similar to flex 216 and PCBA 220 of FIG. 2) may be attached to the OSA 212' at any suitable stage of assembly depending on a preferred sequence.

The assembly of the optoelectronic module 100' may continue by applying a retention mechanism, such as the epoxy 234, to one of the top shell 204' or the bottom shell 206'. The epoxy 234 may be applied in a location on the housing 106' that aligns with a mating surface of the one or more holders 230'. The epoxy 234 may be applied but not cured until a later stage of the assembly. The assembled OSA-port block-holder assembly 354' is next placed in the housing 106', c, illustrated in FIGS. 8 and 9 as being placed in the bottom shell 206' with the holder 230' being aligned to and placed in contact with the epoxy 234.

Further assembly steps may be performed prior to attaching the top shell 204' to the bottom shell 206'. For example, the flex and the PCBA may be coupled to the OSA 212' if these steps were not previously performed. Further, the thermal paste 215' may be applied to the OSA 212' if this step was not previously performed.

Continuing the assembly, the top shell 204' may then be aligned and attached to the bottom shell 206' using attachment means, an example of which may be screws (not shown for clarity but similar to screws 205 of FIG. 2). During attachment of the top shell 204' to the bottom shell 206', forces from the top shell 204' and the bottom shell 206' may be exerted on the OSA 212'. However, since the OSA 212' is fixed to the optical port block 228', the OSA-port block-holder assembly 354' moves as a single assembly in response to these forces. Specifically, the holders 230' removeably attached to the optical port block 228' are "floating" with respect to the housing 106' since the OSA-port block-holder assembly 354' is attached to the housing 106' by uncured epoxy that allows the optical alignment between the OSA 212' and the optical port block 228' to remain unaffected since the OSA-port block-holder assembly 354' moves as a single unit in response to the forces associated with the housing 106' including the forces from the thermal pad 213' and the thermal paste 215'. After the forces on the OSA-port block-holder assembly 354' have stabilized and equalized along the OSA-port block-holder assembly 354', the epoxy 234 may be cured.

Figure 9:
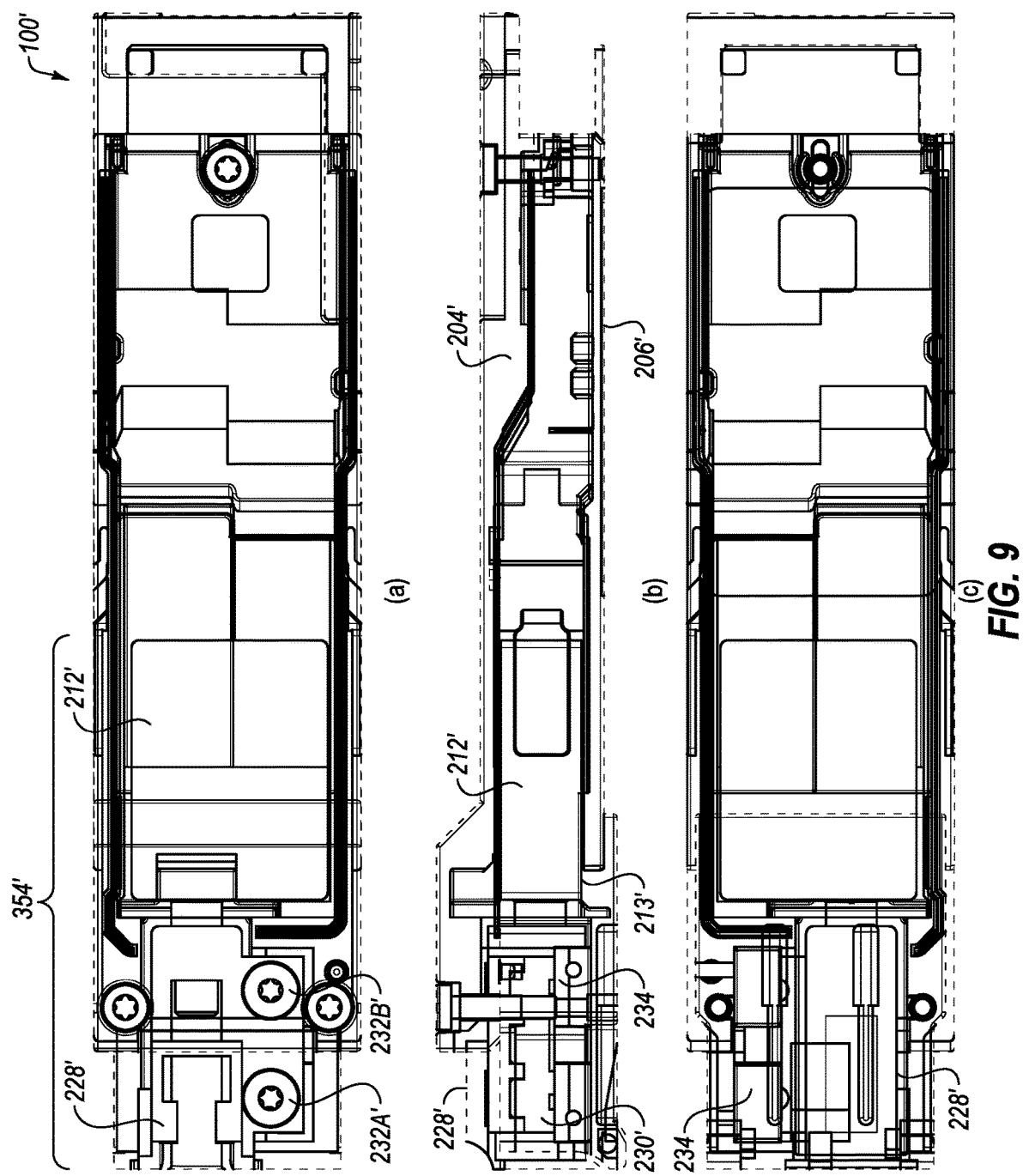
FIG. 9 illustrates various views of the assembled optoelectronic module of FIG. 8.

FIG. 9 illustrates various views of the assembled optoelectronic module 100' of FIG. 8, arranged in accordance with at least one embodiment described herein. The views include a top view (a), a side view (b), and a bottom view (c). In the views of FIG. 9, the top shell 204' and the bottom shell 206' are transparent and shown by outlines, to show the arrangement of the various components in an assembled state.

The top view (a), side view (b), and bottom view (c) illustrate the optoelectronic module 100' with the OSA-port block-holder assembly 354' housed therein. The screws 232A' and 232B' couple the optical port block 228' to the respective one or more holders 230' (side view (b)). The epoxy 234 in a cured state, couples the one or more holders 230' to the bottom shell 206'.

Figure 10:
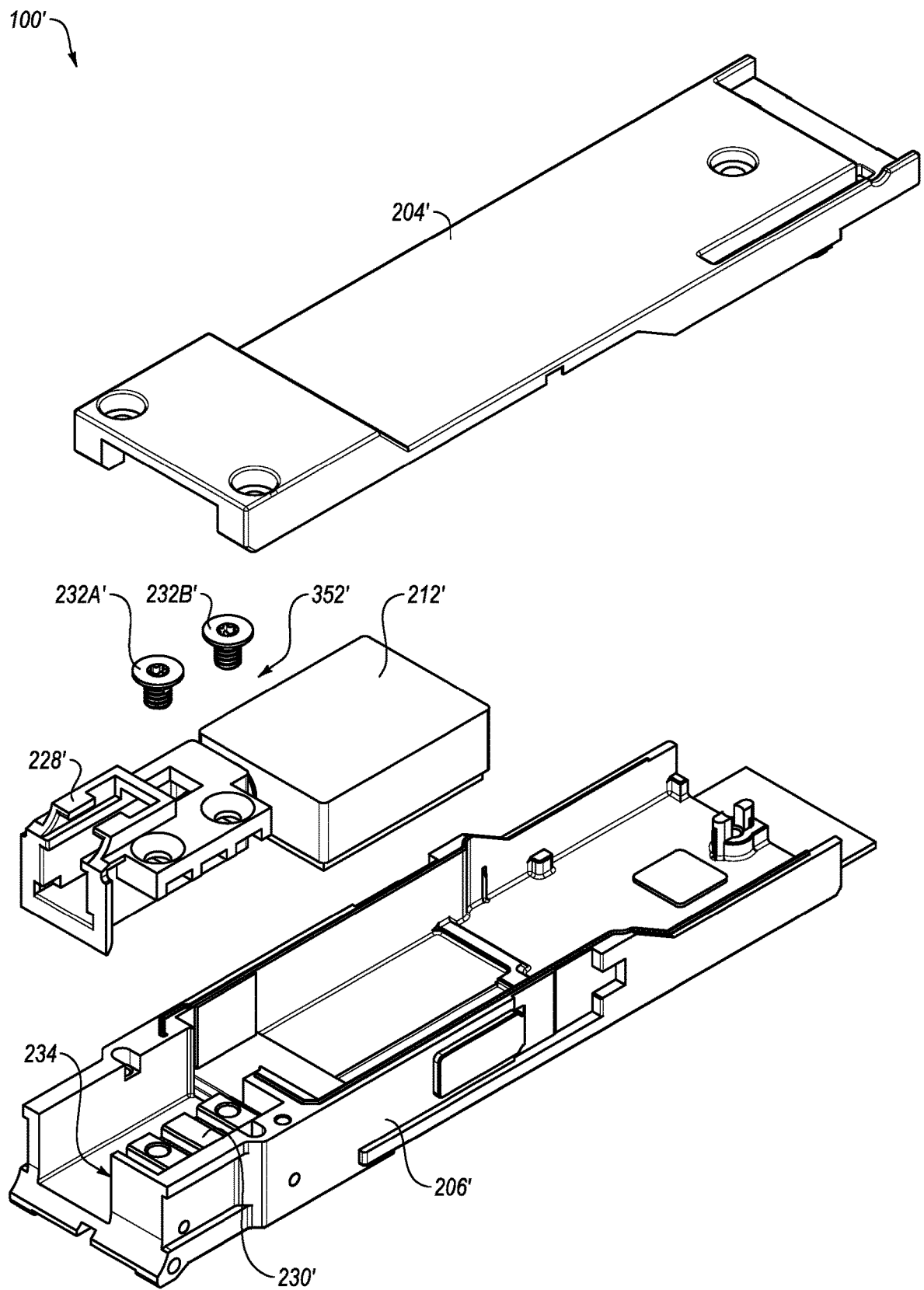
FIG. 10 is a partially exploded view of the optoelectronic module of FIGS. 8 and 9 used to describe an example reworking process, all arranged in accordance with at least one embodiment described herein.

FIG. 10 is a partially exploded view of the optoelectronic module 100' of FIGS. 8 and 9 used to describe an example reworking process, arranged in accordance with at least one embodiment described herein. While the assembly process described above may reduce mechanical stresses on one or more of the OSA 212' and the optical port block 228' by assembling them as a "floating" OSA-port block-holder assembly 354', the optoelectronic module 100' may exhibit malfunctions and/or it may be desirable to remove and salvage costly components from the optoelectronic module 100'. Specifically, the OSA 212' is typically one of the most desirably salvaged components of the optoelectronic module 100', either for rework or for redeployment to another module.

Accordingly, the one or more holders 230' function as sacrificial components or spacers that may be "left behind" with the housing 106' to salvage or retrieve the OSA 212' and the optical port block 228' from the optoelectronic module 100'. For example, to rework or salvage desirable components from the optoelectronic module 100', the top shell 204' may be removed to provide access to the OSA-port blockholder assembly 354'. The screws 232' may be removed to allow the OSA-port block assembly 352' to be removed from the one or more holders 230' that are fixed (via epoxy 234) to the bottom shell 206'. Thereafter, the OSA-port block assembly 352' may be c, reworked or salvaged for reuse.

While various techniques and orders may be used to assemble the optoelectronic module 100, the disclosed embodiments provide a process to secure the OSA inside of the housing with very low or zero stress to prevent bending moment acts upon the OSA that may affect the optical alignment and performance. Specifically, as optical lane speed increases from 10G to 25G and 50G, the aligned optics (i.e., sub-micrometer precision) inside the OSA becomes more sensitive to external forces and bending moments caused by assembly procedures and thermal pads. Further, any movement, including shifting or rotation, of the optics may cause significant optical power loss due to misalignment from its perfect location. Traditional ways of securing the OSA inside a module are to use fasteners such as screws, or constrain with features on the enclosure, or compress with thermal pads, or use epoxies, or the combinations of the above.

The optical port block may be attachably and detachably mechanically coupled to a sacrificial spacer (e.g., holder). The sacrificial spacer may be fluidly coupled (e.g., uncured epoxy) to one side of the optoelectronic module housing. Thereafter, the optoelectronic module housing may be further assembled to enclose the OSA and associated optical port block coupled thereto. After the OSA is enclosed by the optoelectronic module housing and subjected to the associated balanced assembly forces, the sacrificial spacer may be solidly coupled (e.g., curing the epoxy) to the one side of the optoelectronic module housing.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module comprising:
   an optical subassembly (OSA) configured to convert between optical and electrical signals;
   an optical port block attached to the OSA, the optical port block configured to optically align a fiber optic cable with the OSA;
   a housing configured to substantially enclose the OSA and the optical port block; and
   a holder configured to couple the OSA and the optical port block to the housing, wherein the holder is detachably coupled to the optical port block and fixedly coupled to the housing.

2. The optoelectronic module of claim 1, wherein the holder is fixedly coupled to the housing after assembly of the optoelectronic module and wherein during assembly of the optoelectronic module, the holder is floatably coupled to the housing.

3. The optoelectronic module of claim 2, wherein the holder is fixedly coupled to the housing after assembly by cured epoxy and wherein the holder is floatably coupled to the housing during assembly by uncured epoxy.

4. The optoelectronic module of claim 1, wherein the OSA is removable from the optoelectronic module without destruction of the OSA.

5. The optoelectronic module of claim 1, wherein the optical port block is fixedly coupled to the OSA and is removable from the optoelectronic module with the OSA without destruction of the optical port block.

6. An optoelectronic module comprising:
an assembly that includes an optical subassembly (OSA) and an optical port block fixedly attached to the OSA, the OSA configured to convert between optical and electrical signals and the optical port block configured to optically align a fiber optic cable with the OSA;
a housing configured to substantially enclose the assembly; and
at least one holder configured to couple the assembly to the housing, wherein the at least one holder detachably couples on a first end to the assembly and floatably couples on a second end to the housing while the housing is assembled to exert balanced forces on the OSA and fixedly couples on the second end to the housing after the housing is assembled around the assembly.

7. The optoelectronic module of claim 6, wherein the assembly is mechanically and electrically compliant with one of a SFP+ standard, an XFP standard, or a QSFP standard.

8. The optoelectronic module of claim 6, wherein the at least one holder detachably couples on the first end to the assembly using one or more screws.

9. The optoelectronic module of claim 6, wherein the at least one holder floatably couples on the second end to the housing using uncured epoxy while the housing is assembled.

10. The optoelectronic module of claim 9, wherein the at least one holder fixedly couples on the second end to the housing by curing the uncured epoxy.

11. The optoelectronic module of claim 6, further comprising at least one thermal pad placed between the OSA and the housing.

12. The optoelectronic module of claim 6, wherein:
the OSA is removable from the optoelectronic module without destruction of the OSA; or
the assembly is removable from the optoelectronic module without destruction of the assembly.

13. A method, comprising:
coupling an optical subassembly (OSA) to an optical port block to form an assembly, the optical port block optically aligned with the OSA;
detachably coupling at least one holder to the optical port block;
floatably coupling the at least one holder to at least a portion of a housing of an optoelectronic module, the housing configured to substantially enclose the assembly;
enclosing the assembly with the housing; and
fixedly coupling the at least one holder to the at least a portion of the housing after the housing is assembled around the assembly.

14. The method of claim 13, wherein:
coupling the OSA to the optical port block comprises fixedly coupling the OSA to the optical port block;
enclosing the assembly with the housing includes exerting forces on the assembly; and
the assembly moves as a single unit responsive to the exerted forces such that the OSA and the optical port block remain optically aligned.

15. The method of claim 13, wherein the detachably coupling the at least one holder to the optical port block comprises coupling the at least one holder to the optical port block using one or more screws.

16. The method of claim 13, wherein the floatably coupling the at least one holder comprises coupling the at least one holder to the housing using uncured epoxy.

17. The method of claim 16, wherein the fixedly coupling the at least one holder comprises curing the uncured epoxy after the enclosing the assembly.

18. The method of claim 13, further comprising placing at least one thermal pad between the OSA and the housing.

19. The method of claim 13, further comprising salvaging the OSA or the assembly from the optoelectronic module.

20. The method of claim 13, wherein the salvaging comprises removing the OSA or the assembly from the optoelectronic module without destroying the OSA or the assembly.

* * * * *